United States Patent

Rubega

[11] 3,944,966
[45] Mar. 16, 1976

[54] VERSATILE AT-SEA TEST ARRAY AND ANALYSIS SYSTEM

[75] Inventor: Robert A. Rubega, Groton, Conn.

[73] Assignee: The United States of America as represented by the Secretary of the Navy, Washington, D.C.

[22] Filed: Nov. 21, 1974

[21] Appl. No.: 525,691

[52] U.S. Cl. ............... 340/5 C; 340/3 E; 340/3 T; 340/6 R
[51] Int. Cl.² ..................... G01S 7/54; G01S 3/80
[58] Field of Search............. 340/3 E, 3 T, 5 C, 6 R

[56] References Cited
UNITED STATES PATENTS

| | | | |
|---|---|---|---|
| 3,316,529 | 4/1967 | O'Donnell et al. | 340/3 E |
| 3,588,798 | 6/1971 | Papineau | 340/5 C |
| 3,885,515 | 5/1975 | Caldwell, Jr. et al. | 340/3 T |

Primary Examiner—Richard A. Farley
Attorney, Agent, or Firm—Richard S. Sciascia; Arthur A. McGill; Prithvi C. Lall

[57] ABSTRACT

A versatile at-sea test array for performing test functions such as measuring the acoustic performance of large aperture sonar systems. The array system comprises a linear horizontal array including at least two measurement transducer elements, a pair of transponders and a drogue for its deployment. The horizontal linear array is used to accumulate and analyze acoustic data of a ship, both surface and submarine, in the vicinity of the array and the two transponders are used to get the geometric data for the system and the two measurements combined together enables one to determine the amplitude of the signals as well as the slope or rate of amplitude variation of the signal as a function of the azimuth angle, thus helping accurate determination of the angular distribution of the acoustic energy being measured.

8 Claims, 1 Drawing Figure

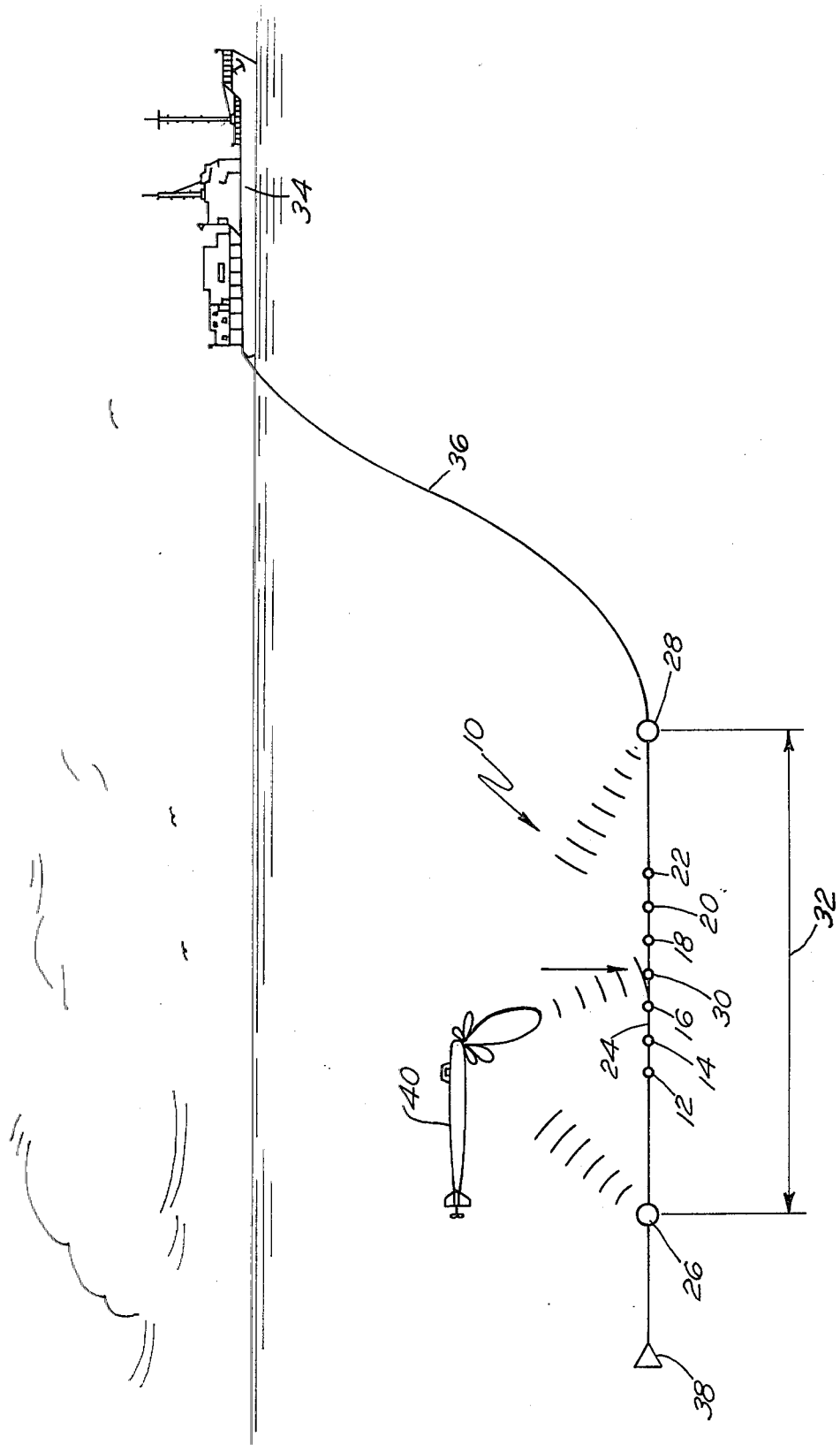

VERSATILE AT-SEA TEST ARRAY AND ANALYSIS SYSTEM

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

This invention relates to systems for performing test functions such as measuring the acoustic performance of large apparture sonar systems, target strength measurements and bearing accuracy measurement. The embodiment discloses a versatile at-sea test array for performing such test functions.

Acoustic performance data of sonar systems has been obtained by poorly controlled tests involving a single point acoustic source. The desired data is extremely difficult to obtain and analyze and the results can not be interpreted with a high degree of accuracy. The fundamental problem is control of the experiment in an open sea environment. Efforts have been made to develop a fixed sonar range to provide the accurate tracking information necessary to obtain the control of the experiment necessary to analyze that data with confidence. However, it is not always possible to bring the fixed range to the fleet. Thus there is a need for having a practical device which is versatile and can be made compatible with existing operational winches and towed array cables as auxiliary equipment to perform several important test functions such as measuring the acoustic performance of large apparture sonar systems, serving as an acoustic target to ship's sonar for obtaining fire control solution and serving as a distributed acoustic target for homing torpedoes.

SUMMARY OF THE INVENTION

The objects and advantages of the present invention are accomplished by utilizing a mobile and versatile at-sea test array system which comprises a linear horizontal array including at least two measurement transducer elements; two transponders, one of the transponders located at one end of the array and the other one located at the other end thereof; and a drogue for deployment and to maintain appropriate tension on the array. The transponders act as tracking transducer elements for the system. A third tracking transducer element is located at the mid point of the line joining the various measurement transducer elements of the array. The two tracking transducer elements or transponders located at the extreme ends of the line array are part of a transponder system which are both transmitters and receivers, while the third tracking transducer element located at mid point in the line array need be a receiver only. The response frequency of the transponders is controlled by the static pressure at the depth of the measurement line. The line array comprising both the measurement transducer elements and the tracking transducer elements is configured to be capable of being coupled directly to the tow cable of the existing towed sonar. The horizontal linear array comprising the measurement transducer elements the tracking transducer elements or transponders is used to accumulate for analysis, acoustic data of a ship in the vicinity of the array. The transponders are used to get the geometric data for the system and the measurement transducer elements are used to accumulate acoustic data of system. The geometric data and the acoustic data so obtained are used to determine the amplitude of the acoustic signals of an acoustic beam and the slope or rate of amplitude variation of the acoustic signals of the beam as a function of the azimuth angle, which is utilized to determine the shape of the beam profile more accurately.

An object of this invention is to provide a mobile, practical device compatible with operational towing cables and storage equipment which allows the careful measurement of sonar characteristics which heretofore could be measured only with great difficulty under very special tests.

Another object of this invention is to devise a system which can be used as a target for closely observable weapon tests in the open sea.

Still another object of this invention is to devise a system wherein the analysis data is obtained in such a manner that not only can it be analyzed by relating the amplitude observed with the measured angle of its arrival but also by the amplitude-slope technique which reduces the necessary precision of the angle of arrival measurement.

A further object is to allow the measurement of submarine target strengths.

An additional object is to measure the radiated noise spectra of ships.

Still another object of this invention is to devise an array system which is self contained in that no auxiliary equipment, such as bottom mounted hydrophones or sonobuoys, is required.

Still another object of this invention is to devise an array system which eliminates the problems associated with transference of data from remote stations and surveying the position of the remote stations etc.

Other objects, advantages and novel features of the invention will become apparent from the following detailed description of the invention when considered in conjunction with the accompaning drawing, the single FIGURE of which illustrates a versatile test array system constructed in accordance with the teachings of the present invention.

BRIEF DESCRIPTION OF THE DRAWING

The FIGURE shows a pictorial-schematic representation of the present invention.

DESCRIPTION OF A PREFERRED EMBODIMENT

A preferred embodiment of a versatile test array and analysis system is shown in the FIGURE, wherein numeral 10 represents a schematic representation of a test array which comprises a number of measurement transducers 12, 14, 16, 18, 20, and 22 arranged in a horizontal line configuration suitable for towing in a manner similar to the currently towed sonar lines. Transducers 12, 14, 16, 18, 20 and 22 are located at a predetermined separation distance apart and each of them is capable of being used either as a hydrophone (receiver) or projector (transmitter). It should be clearly understood that for purposes of illustration only 6 such measurement transducer elements have been shown. However, any suitable number of measurement transducer elements arranged in a horizontal line configuration can be used. If one makes the distance between two consecutive measurement transducer elements equidistant and equal to $d$, the length line of measurement elements is given by $(9-1)\ d$ where $n$ represents the number of measurement transducer elements arranged in a line configuration 24. Measurement line 24 is preferrably located midway between two tracking transducer elements or transponders 26 and 28 which are separated by distance L designated by numeral 32. A third tracking transducer element 30 is located at the midpoint of the separation distance L between transponders 26 and 28. Transponders 26 and 28, located at the extreme ends of line 24, are part of a transponder system while the tracking transducer element 30 located midway between the measurement transducer elements need to be a receiver transducer only and can in fact be one of the measurement transducer. The response frequency of transponders 26 and 28 is controlled by the static pressure at the depth of measurement line 24. Line array 10 comprising both measurement transducer element and tracking transducer elements is configured to be capable of being coupled directly to the tow cable of existing towed sonar.

The transducer elements including measurement and tracking transducer elements, are cabled directly back to the towed vessel 34 by an existing operational tow cable 36 by the use of appropriate conventional interfacing electronic switching and/or multiplexing equipment. The interfacing equipment is designed to allow signals from the measurement and tracking transducer elements to be transmitted separately to vessel 34 for recording and subsequent analysis. Tow cable 36 also allows transmission of power to the transducer elements for the transmission of acoustic signals into the water. As an illustation, a target such as a submarine 40 for test purposes is shown in the FIGURE. It should be pointed out that all transducer elements used in the embodiment described herein are conventional such as piezo-electric transducers. However, they can be substituted for equivent transducer elements without deviation from the teachings of this invention. The tension on the horizontal array 10 for any given tow speed is controlled by using a conventional drogue 38.

For illustation purposes of how the test array can be used, the following four cases are described. There are other uses including target strength measurement and radiated noise measurements.

a. Measurement of the Transmitting Characteristics of a Ship's Active Sonar:

The ship under test transmits an interrogation ping and receives responses from tracking transponders 26 and 28 on the measurement line 24. The frequency of the transponder responses will indicate the depth of measurement array to the ship under test. The arrival times and the known separation, L, of transponders 26 and 28 will allow the determination of the range and bearing of the ship with the respect to the midpoint and orientation of measurement line array 10. With this tracking information, the ship under test can maneuver to a necessary and predetermined track for valid sonar data to be obtained. Simultaneously, the interrogation pings transmitted by the ship under test are received by the three tracking transducer elements 26, 28, and 30 and transmitted via the tow cable 36 to the tow vessel 34. This interrogation ping can also, if desired, be coded, i.e., for example frequency coded, to the depth of the ship under test. In this manner, the tow vessel 34 can simultaneously and independently obtain the range, bearing, and depth of the ship under test relative to the measurement array 10.

Once the necessary relative position of the ship under test and the measurement array 10 has been obtained, the ship under test transmits a ping through the sonar beam under test. This transmission is received by each of the measurement transducer elements of the measurement array 10, thus providing an acoustic 'snapshot' of a portion of the sonar beam, subtending an angle dependent upon the length, $(n-1)d$, of the measurement array and the range. Within this subtended angle, $n$ measurements will be made with a deviation angle dependent upon $d$, the separation distance between two consecutive measurement transducer elements, and the range. The availability of data in this form allows the use of an amplitude-slope technique and reduces the precision required in the measurement of the relative bearing of the ship under test with respect to the measurement line 10. The basic approach in amplitude-slope technique is to measure and utilize both the amplitude and rate of change of amplitude with deviation angle as function of the deviation angle from the main response axis of the acoustic beam. The advantages of utilizing the rate of change of amplitude as function of the deviation angle manifest themselves more strongly as one approaches the mulls of the beam pattern and become particular useful when one is dealing with a narrow beam where the rate of change of amplitude with deviation angle becomes quite large as in this region of the beam pattern, the amplitude is a strong function of the deviation angle. Thus when one attempts to sample the beam pattern by measuring the amplitude and angle, the strong coupling bewteen the two because of their functional relationship results in a very wildly varying data when one attempts to plot the amplitude against the deviation angle. This is also true when one attempts to plot the rate of change of amplitude with the deviation angle against the deviation angle. Consequently, one requires increasingly more stringent tolerence on the measurement of the deviation angles in both cases as the mulls are approached in order to plot the amplitude, or slope, data to properly depict the characteristic of the acoustic beam pattern. However, it should be noted that although amplitude versus deviation angle and rate of change of amplitude with deviation angle against deviation angle are varying wildly because of uncertainty of our knowledge of the deviation angle, a plot of amplitude versus rate of change of amplitude with the deviation angle is a very well behaved function. This is so because although these parameters are uncertain at the exact value of deviation angle at which they were measured, we can be certain that both variables, i.e., the amplitude and rate of change of amplitude with deviation angle were measured at the same deviation angle and thus the errors involved are only those of measurement and not of correlated functional behavior. Thus the amplitude-slope technique is quite useful to determine the transmitting characteristics of a ship's active sonar beam.

b. Measurement of the Receiving Characteristic of a Ship's Sonar System:

In this case the tracking and station keeping functions are identical to the case discussed above in (a). However, the measurement transducer elements are made to sequentially transmit a short ping. Thus, the sonar under test will receive a series of successive pings which will "walk across" an angular aperture dependent upon the number of measurement elements used, the separation distance, $d$, between any two consecutive measurement transducer elements and the range.

The number of measurement transducer elements used will depend upon the specific geometric parameters of the test, the essential limiting factor being the time between the first direct arrival and the first surface reflected, interference arrival. The data to be analyzed with be recorded on the ship under test, through the sonar under test, and the slope-amplitude technique described above, as well as the standard amplitude direction technique can be used.

c. Target for Fire Control Purpose:

The radiating feature of the measurement array 10 allows the array to be utilize as a test target for both active and passive fire control systems. In both cases, the measurement array 10 supplies a radiated signal. In the active case, the measurement line is used in a "transponderlike" mode transmitting a series of shaped "echoes" in response to an interrogation. In the passive case, the measurement line transmit a simulated ship's signature.

d. Target for a Homing Weapon:

In this case, the measurement transducer elements provide radiated signals i.e. either in a continuous fashion for a passively homing torpedo or an intermittent fashion for an actively homing torpedo, at the torpedo design frequency. One of the important and easily obtainable features is that the target be spacialy distributed and not a point source as the weapon approach. Furthermore, the tracking feature of the measurement system allows real time tracking of the weapon on the target tow vessel so that its approach running characteristics can be observed during the test.

Briefly stated a versatile at-sea test array for performing test functions such as measuring the acoustic performance of large aperture sonar systems and the like comprises a linear horizontal array including a plurality of measurement transducer elements, a pair of transponders and a drogue for its deployment. The horizontal linear array is used to accumulate and analyze acoustic data of a ship under test and amplitude of the acoustic beam and the rate of change of amplitude of the acoustic beam with deviation angle as a function of deviation angle. Amplitude-slope technique is then applied to analyze the data to obtain the necessary beam characteristics. The test array can be used for (a) measuring transmitting characteristics of a ship's active sonar, (b) for measuring the receiving characteristics of a ship's sonar system, (c) as a target for fire control purposes, (d) as a target for a homing weapon, (e) for measuring target strength and (f) for measuring radiated noise.

Obviously, many modifications and variations of the present invention are possible in the light of the above teachings. As an example, the number of measurement transducer elements used in the horizontal linear array can vary and the distance between any two consecutive measurement tranducer elements can also vary to suit the needs of a particular test. Furthermore, the transducer elements can be other than piezo-electric type transducer. Furthermore, the type of drogue used to control the position of the linear can be varied to fit the needs of test being conducted. Additionally, the system need not be towed but can be disposed in a fixed position. It is therefore to be understood that within the scope of the appended claims the invention may be practiced otherwise than as specifically described.

I claim:

1. A test array system for testing sonar systems in a body of water which comprises:
   a plurality of transducer elements being arranged in a linear array;
   a pair of transponders, one of said pair of transponders being located adjacent one end of said linear array and the other transponder of said pair of transponders being located adjacent the other end of said linear array; and
   sensing means for tracking, said sensing means being located adjacent the mid point of said linear array.

2. The array system of claim 1 further comprising:
   towing means for towing the test array in the body of water.

3. The array system of claim 2 wherein each of said plurality of transducer elements includes a hydrophone and a projector.

4. The array system of claim 3 wherein each of said pair of transponders includes a hydrophone and a projector.

5. The array system of claim 4 wherein said sensing means includes a hydrophone.

6. The array system of claim 5 wherein said pair of transponders are located at the ends of said linear array.

7. The array system of claim 6 wherein said tracking means is located at the mid point of said linear array.

8. The array system of claim 7 wherein said linear array is a horizontal linear array.

* * * * *